US012709253B2

(12) United States Patent
Miller, Jr. et al.

(10) Patent No.: US 12,709,253 B2

(45) Date of Patent: Aug. 18, 2026

(54) SYSTEMS AND METHOD FOR CONTROLLING BRAKING AT A TRAILER BASED ON FORWARD LOOKING IMAGING SENSOR DATA

(71) Applicant: Bendix Commercial Vehicle Systems LLC, Avon, OH (US)

(72) Inventors: Thomas S. Miller, Jr., Lagrange, OH (US); Subashish Sasmal, Avon, OH (US)

(73) Assignee: Bendix Commercial Vehicle Systems LLC, Avon, OH (US)

(*) Notice: Subject to any disclaimer, the term of this patent is extended or adjusted under 35 U.S.C. 154(b) by 50 days.

(21) Appl. No.: 18/953,758

(22) Filed: Nov. 20, 2024

(65) Prior Publication Data

US 2026/0138572 A1 May 21, 2026

(51) Int. Cl.

| | |
|---|---|
| ***B60T 8/17*** | (2006.01) |
| ***B60T 7/20*** | (2006.01) |
| ***G06V 20/56*** | (2022.01) |

(52) U.S. Cl.

CPC .............. *B60T 8/1701* (2013.01); *B60T 7/20* (2013.01); *B60T 2210/24* (2013.01); *B60T 2250/02* (2013.01); *B60T 2250/04* (2013.01); *G06V 20/588* (2022.01)

(58) Field of Classification Search

CPC ...... B60T 8/1701; B60T 7/20; B60T 2210/24; B60T 2250/02; B60T 2250/04; G06V 20/588

See application file for complete search history.

(56) References Cited

U.S. PATENT DOCUMENTS

2023/0166700 A1* 6/2023 Bennati .................. B60T 8/172 701/70

* cited by examiner

*Primary Examiner* — Long T Tran

*Assistant Examiner* — Charles J Brauch

(74) *Attorney, Agent, or Firm* — Crowell & Moring LLP

(57) ABSTRACT

Systems and methods for controlling braking at a trailer in a tractor-trailer vehicle configuration based on forward looking imaging sensor data are disclosed. In one form, a system comprises a processor configured to receive instructions to initiate braking of a vehicle and a trailer; receive information from a sensor comprising data regarding a forward-looking view from the vehicle; and receive vehicle performance information. The processor is further configured to determine a predicted path of the vehicle and trailer based on the information from the sensor; determine autonomous braking controls for the vehicle and the trailer based on the predicted path; and transmit the autonomous braking controls to the trailer that are configured to adjust a braking pressure level and a braking duration at the trailer as the vehicle and trailer travel through at least a portion of the predicted path.

14 Claims, 6 Drawing Sheets

SYSTEMS AND METHOD FOR CONTROLLING BRAKING AT A TRAILER BASED ON FORWARD LOOKING IMAGING SENSOR DATA

BACKGROUND

In tractor-trailer vehicle configurations utilizing trailers with autonomous braking, when a tractor needs to slow down, brake control systems on the tractor are not aware if braking systems on one or more trailers coupled with the tractor, such as anti-lock braking systems (ABS systems), are working correctly. As a result, brake control systems on the tractor may assume that trailer ABS systems are not working and artificially act as ABS systems for the trailers by pulsing the brakes of the one or more trailers. When operating in this manner, potential braking capability of the trailers is being traded for increased safety. Braking systems are desirable that are able to maintain a high level of safety while utilizing more braking capability of the trailers.

SUMMARY OF THE DISCLOSURE

The present disclosure addresses the above problem and provides systems and methods for controlling braking at a trailer in a tractor-trailer vehicle configuration based on forward looking imaging sensor data.

In one aspect, the disclosure provides a system comprising a memory and at least one processor in communication with the memory. The at least one processor is configured to receive instructions to initiate braking of a vehicle and a trailer coupled with the vehicle; to receive information from an imaging sensor, the information comprising at least data regarding a forward-looking view from the vehicle; and to receive vehicle performance information regarding the vehicle and the trailer.

The at least one processor is further configured to determine a predicted path of the vehicle and trailer based on the information from the imaging sensor and the vehicle performance information; determine autonomous braking controls for the vehicle and the trailer based on the predicted path; and transmit the autonomous braking controls to the trailer, where the autonomous braking controls are configured to adjust a braking pressure level and a braking duration at the trailer as the vehicle and trailer travel through at least a portion of the predicted path.

In another aspect, the disclosure provides a method. In the method, at least one processor receives instructions to initiate braking of a vehicle and a trailer coupled with the vehicle; receives information from an imaging sensor, the information comprising at least data regarding a forward-looking view from the vehicle; and receives vehicle performance information regarding the vehicle and the trailer.

Further, the at least one processor determines a predicted path of the vehicle and trailer based on the information from the imaging sensor and the vehicle performance information; determines autonomous braking controls for the vehicle and the trailer based on the predicted path; and transmits the autonomous braking controls to the trailer, where the autonomous braking controls are configured to adjust a braking pressure level and a braking duration at the trailer as the vehicle and trailer travel through at least a portion of the predicted path.

DETAILED DESCRIPTION OF THE DRAWINGS

The present disclosure is directed to systems and methods for controlling autonomous braking at a trailer in a tractor-trailer vehicle configuration based on forward looking imaging sensor data.

As discussed in more detail below, implementations of the present disclosure provide a system that utilizes data from one or more forward-looking imaging sensors, such as cameras, LIDAR, etc. to monitor a state of a road ahead of a vehicle. The system may monitor for cars slowing in the road, objects in the road, and/or a state of the road such as whether the road is straight and/or includes curves.

Based on the data from the one more forward-looking imaging sensors, the system determines how to apply the brakes at the trailer in order to maintain stability while utilizing an increased amount of braking capacity at the trailers. For example, when the data indicates that a road ahead of a vehicle is in a straight line, the system may apply up to full braking at the trailer. However, when the data indicates that a road ahead of the vehicle includes one or more curves, because the system does not know if driver assistance systems of the trailer such as ABS are working correctly, the system determines, based on the curvature of each curve, a duty cycle to pulse the brakes at the trailer and/or a brake magnitude to apply to the brakes during the one or more curves in order to maintain stability while utilizing an optimal amount of braking capacity at the trailer.

Figure 1:
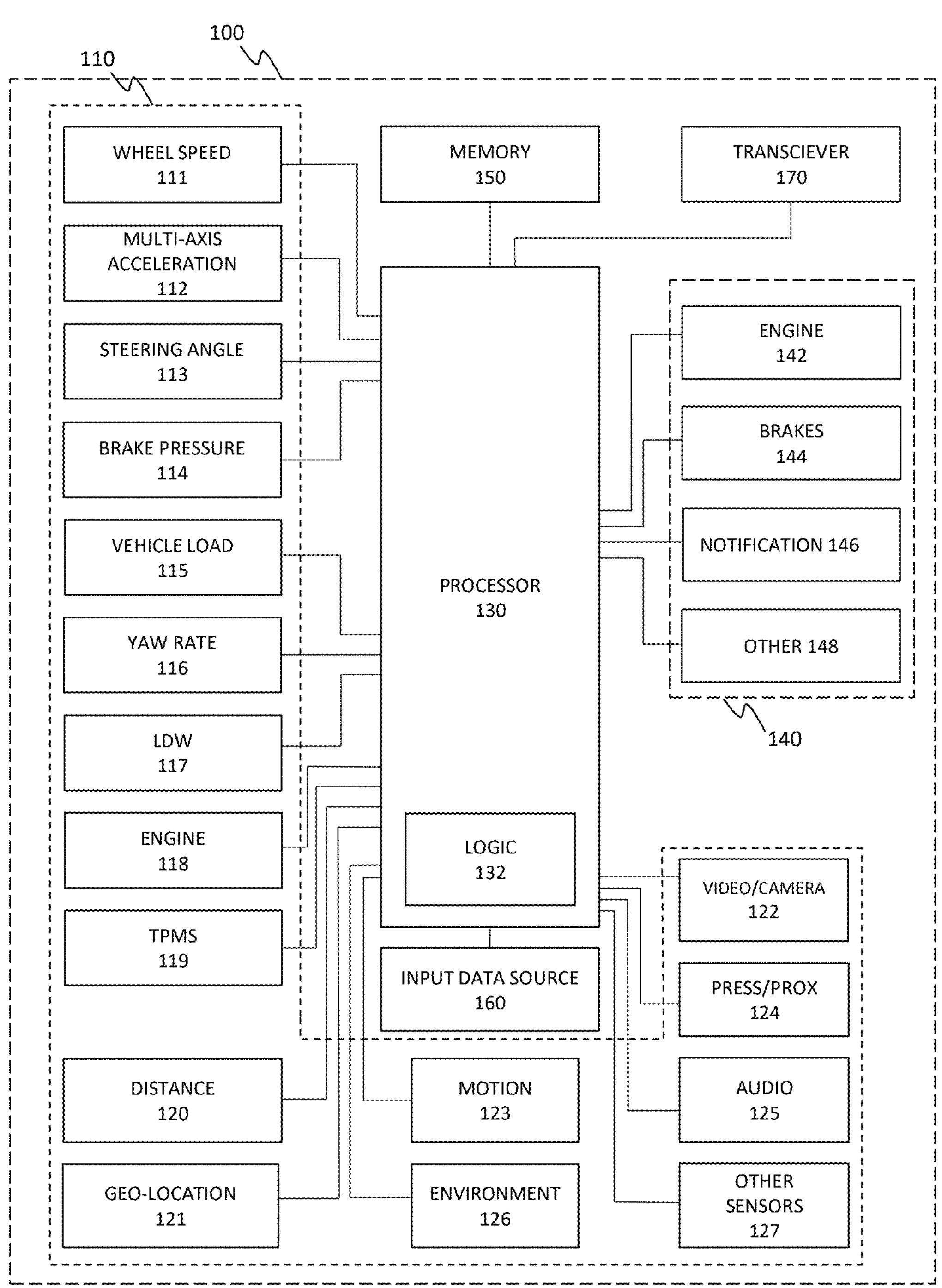
FIG. 1 is a block diagram of one form of an environment in which a system may operate that controls braking at a trailer in a tractor-trailer vehicle configuration based on forward looking imaging sensor data.

FIG. 1 is a block diagram of one form of an environment in which a system 100 may operate that controls autonomous braking at a trailer in a tractor-trailer vehicle configuration based on forward looking imaging sensor data.

The system 100 may include, or be in communication with, one or more devices or systems 110 for providing vehicle and/or driver related data, including data indicative of one or more operating parameters or one or more conditions of a vehicle, its surroundings and/or its cabin occupants. The system 100 may, alternatively or additionally, include a signal interface for receiving signals from the one or more devices or systems 114, which may be configured separate from system 100. For example, the devices 110 may be one or more sensors, such as but not limited to, one or more wheel speed sensors 111, one or more acceleration sensors such as multi-axis acceleration sensors or lateral movement acceleration sensors 112, a steering angle sensor 113, a brake pressure sensor 114, one or more vehicle load sensors such as axle pressure sensors positioned at axles of a tractor and/or a trailer 115, a yaw rate sensor 116, a lane departure warning (LDW) sensor or system 117, one or more engine speed or condition sensors 118, and a tire pressure (TPMS) monitoring system 119. The system 100 may also utilize additional devices or sensors, including for example a forward distance sensor and/or a rear distance sensor 120 (e.g., radar, lidar, etc.) and/or a geo-location sensor 121. Additional sensors for capturing driver related data may include one or more video sensors 122 and/or motion sensors 123, pressure or proximity sensors 124 located in one or more seats and/or driver controls (e.g., steering wheel, pedals, etc.), audio sensors 125, or other sensors configured to capture driver related data. The system 100 may also utilize environmental sensors 126 for detecting circumstances related to the environment of the driving excursion, including for example, weather, road conditions, time of day, traffic conditions, etc. Other sensors 127, actuators and/or devices or combinations thereof may be used or otherwise provided as well, and one or more devices or sensors may be combined into a single unit as may be necessary and/or desired. For example, biometric sensors may be included for detecting biometric data of the vehicle occupants.

The system 100 may also include a logic applying arrangement such as a controller or processor 130 and control logic 132, in communication with the one or more devices or systems. The processor 130 may include one or more inputs for receiving data from the devices or systems. The processor 130 may be adapted to process the data and compare the raw or processed data to one or more stored threshold values or desired averages or value ranges, or to process the data and compare the raw or processed data to one or more circumstance-dependent desired value, so as to detect one or more driver and/or vehicle related events.

The processor 130 may also include one or more outputs for delivering a control signal to one or more vehicle control systems 140 based on the detection of the event(s) and/or in response to vehicle and/or driver related data. The control signal may instruct the systems 140 to provide one or more types of driver assistance warnings (e.g., warnings relating to braking, obstacle avoidance, driver performance, passenger performance, etc.) and/or to intervene in the operation of the vehicle to initiate corrective action. For example, the processor 130 may generate and send the control signal to an engine electronic control unit 142 or an actuating device to reduce the engine throttle and slow the vehicle down. Further, the processor 130 may send the control signal to one or more vehicle brake systems 144 to selectively engage the brakes (e.g., a differential braking operation). A variety of corrective actions may be possible and multiple corrective actions may be initiated at the same time. It will be understood that such corrective actions need not be contemporaneous with detected events and/or event data, and may, additionally or alternatively, be responsive to one or more historical records of detected events and/or event data. The corrective actions may precede an anticipated driver behavior change or predicted event or change of circumstances.

The vehicle control components may further include brake light(s) and other notification devices 146, which may be configured to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, warnings related to driver performance, warnings related to passenger performance, and any other type of warning or notification in furtherance of the embodiments described herein. Other vehicle control systems 148 may also be controlled in response to detected events and/or event data.

The system 100 may also include a memory portion 150 for storing and accessing system information, such as for example the system control logic 132. The memory portion 150, however, may be separate from the processor 130. The sensors 110, controls 140 and/or processor 130 may be part of a preexisting system or use components of a preexisting system.

The system 100 may also include a source of vehicle-related input data 160, which may be indicative of a configuration/condition of the commercial vehicle and/or its environmental circumstances (e.g., road conditions, geographic area conditions, etc.).

In addition, the system 100 may be operatively coupled with one or more imaging devices 122. The imaging devices 122 may be disposed on the vehicle such as, for example, a video camera on each corner of the vehicle, one or more cameras mounted remotely and in operative communication with the system 100 to record images of the roadway ahead of the vehicle. Such cameras may, for instance, indicate undesirable proximity to objects, the roadway verge, etc.

The system 100 may also include a transmitter/receiver (transceiver) module 170 such as, for example, a radio frequency (RF) transmitter including one or more antennas for wireless communication of data and control signals, including control requests, event-based data, performance-based data, vehicle configuration/condition data, or the like, between the vehicle and one or more remote locations/devices, such as, for example, backend servers, dispatch center computers, and mobile devices, having a corresponding receiver and antenna. The transmitter/receiver (transceiver) module 170 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 may be operative to select and combine signals from the sensor systems into event-based data and/or performance-based data representative of higher-level vehicle and/or driver related data. For example, data from the multi-axis acceleration sensors 112 may be combined with the data from the steering angle sensor 113 to determine excessive curve speed event data. Other hybrid data relatable to the vehicle and/or driver and obtainable from combining one or more selected raw data items from the sensors includes, for example and without limitation, excessive braking event data, excessive curve speed event data, lane departure warning event data, excessive lane departure event data, lane change without turn signal event data, lane change without mirror usage data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, following distance event data, fuel consumption event data, ACC usage event data, and late speed adaptation (such as that given by signage or exiting). Still other hybrid data relatable to the vehicle and/or driver and obtainable from combining one or more selected raw data items from the sensors includes, for example and without limitation, driver out of position event data, passenger out of position event data, driver distracted event data, driver drowsy event data, driver hand(s) not on wheel event data, passenger detected event data, wrong driver event data, seatbelt not fastened event data, driver cellphone use event data, distracting passenger event data, mirror non-use event data, unsatisfactory equipment use event, driver smoking event data, passenger smoking event data, insufficient event response event data, insufficient forward attention event data. The aforementioned events are illustrative of the wide range of events that can be monitored for and detected by the system 100, and should not be understood as limiting in any way.

The system 100 may further include a bus or other communication mechanism for communicating information, coupled with the processor 130 for processing information. The system may also include a main memory 150, such as random access memory (RAM) or other dynamic storage device for storing instructions and/or loaded portions of a trained neural network to be executed by the processor 130, as well as a read only memory (ROM) or other static storage device for storing other static information and instructions for the processor 130. Other storage devices may also suitably be provided for storing information and instructions as necessary or desired.

In at least some implementations, the system 100 of FIG. 1 is configured to execute one or more software systems or modules that perform or otherwise cause the performance of one or more features and aspects described herein. Computer executable instructions may therefore be read into the main memory 150 from another computer-readable medium, such as another storage device, or via the transceiver 170. Execution of the instructions contained in main memory 150 may cause the processor 130 to perform one or more of the process steps described herein. In some implementations, hard-wired circuitry may be used in place of or in combination with software instructions to implement the invention. Thus, implementations of the example embodiments are not limited to any specific combination of hardware circuitry and software.

Methods for controlling braking at a trailer in a tractor-trailer vehicle configuration based on forward looking imaging sensor data, such as those described below, may be performed within the system environment described above in conjunction with FIG. 1.

As will be described in conjunction with FIGS. 2-6, in some implementations, a system utilizes data from one or more forward-looking imaging sensors, such as cameras, to monitor a state of a road ahead of a vehicle. The system may monitor for cars slowing in the road, objects in the road, and/or a state of the road such as whether the road is straight and/or includes curves.

Based on the data from the one more forward-looking imaging sensors, the system determines how to apply autonomous brakes at the trailer in order to maintain stability while utilizing an increased amount of braking capacity at the trailers. For example, when the data indicates that a road ahead of a vehicle is in a straight line, the braking system may apply up to full braking of the brakes at the trailer. However, when the data indicates that a road ahead of the vehicle includes one or more curves, the system determines, based on the curvature of each curve, a duty cycle to pulse the brakes at the trailer and/or a magnitude to apply the brakes at the trailer during the one or more curves in order to maintain stability while utilizing an optimal amount of braking capacity at the trailer.

Figure 2:
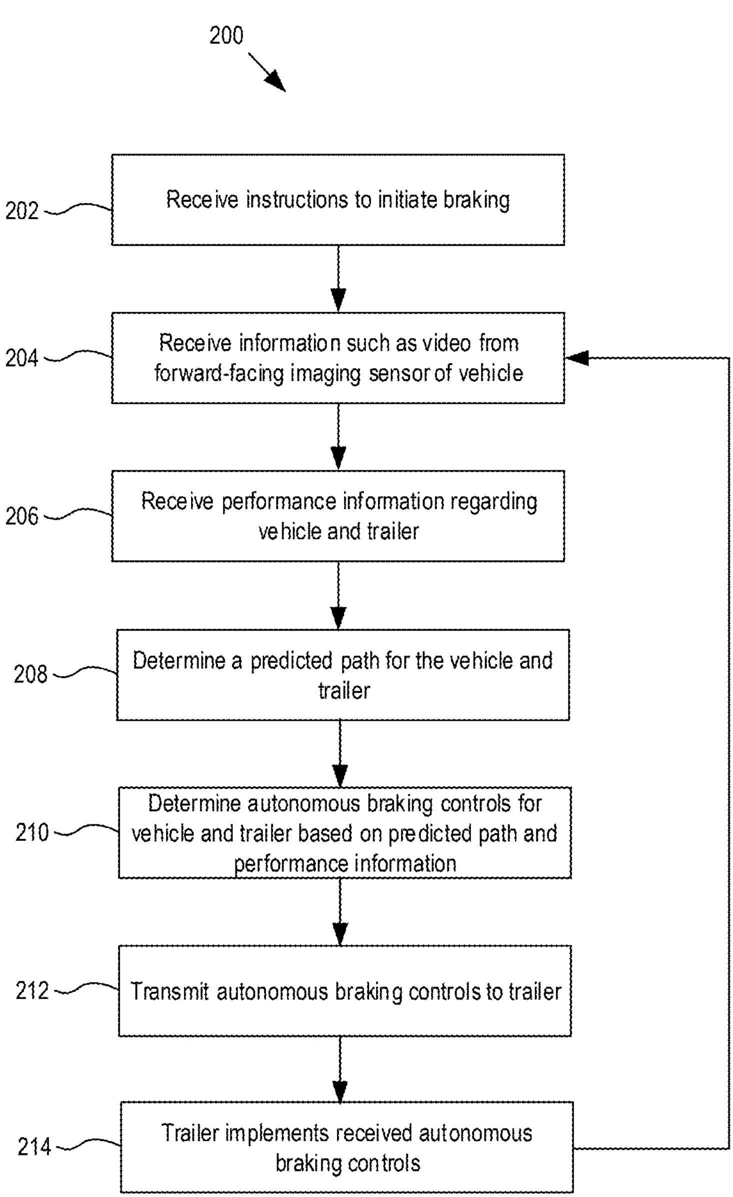
FIG. 2 is a flow chart of one form of a method for controlling autonomous braking at a trailer in a tractor-trailer vehicle configuration based on forward looking imaging sensor data.

FIG. 2 is a flow chart of one form of a method 200 for controlling autonomous braking at a trailer in a tractor-trailer vehicle configuration based on forward looking imaging sensor data.

At step 202, one or more processors of the braking system positioned in a vehicle, such as those described above in conjunction with FIG. 1, receive instructions to initiate braking of a vehicle and at least one trailer coupled with the vehicle. In some implementations, the instructions to initiate braking of the vehicle may be received from vehicle systems such as driver assistance systems or autonomous driving systems. However, in other implementations, the instructions to initiate braking of the vehicle may be received from a driver of the vehicle performing an action such as depressing a brake pedal.

At step 204, the one or more processors receive information such as video information from a forward-facing imaging sensor. In some implementations, the imaging sensor may be a camera that generates video of a road and objects in front of a vehicle. The video information from the forward-facing imaging sensor may additionally include information such as road lane information, road curvature information, or any other type of information that may be obtained from data of a forward-facing imaging sensor that may be helpful to a system in determining a duty cycle and/or brake magnitude for application of autonomous braking at the trailer.

At step 206, the one or more processors receive vehicle performance information regarding the vehicle and the trailer. In some implementations, the one or more processors may receive information from sensors of the vehicle and/or trailer, or other systems of the vehicle and/or trailer, such as a speed of the vehicle, a steering angle of the vehicle, a mass of the vehicle and the trailer, or any other type of vehicle performance information that may be helpful to the braking system in determining a duty cycle and/or brake magnitude for application of braking at the trailer.

At step 208, the one or more processors determine a predicted path of the vehicle and trailer based on the video information received at step 204. For example, the one or more processors may determine based on the video information which portions of the predicated path of the vehicle are straight and which portions of the predicted path are curved, a length of the straight portions and/or curved portions of the path, a degree of radius of the curved portions, and/or a direction of curve of the curved portions.

At step 210, the one or more processors determine autonomous braking controls for the vehicle and the trailer based on the predicted path determined at step 208 and the vehicle performance information received at step 206. As noted above, the predicted path may include information such as which portions of a predicated path are straight or curved, as well as the characteristics of the straight and/or curved portions. The one or more processors utilize information such as a speed of a vehicle, a steering angle of the vehicle, and/or a mass of the vehicle and the trailer to determine how to implement braking along the predicted path. In some implementations, the one or more processors may utilize information stored in lookup tables at the vehicle to determine a mass of the vehicle and/or trailer and to determine braking controls for the vehicle and the trailer based on the predicted path determined at step 208 and the vehicle performance information received at step 206.

In one illustrative example, the one or more processors determine that the predicted path indicates a straight path for a braking zone of the vehicle and the trailer. Accordingly, the one or more processors determine the autonomous braking controls for the trailer in the braking zone provide for up to full braking.

In another illustrative example, the one or more processors determine that the predicted path indicates a curve within a braking zone of the vehicle and the trailer. Accordingly, the one or more processors determine the autonomous braking controls for the trailer in the braking zone comprise a duty cycle where a level of pulsing of the brakes is adjusted based on a degree of the curve in the braking zone.

In yet another illustrative example, the one or more processors determine that the predicated path comprises a first braking zone and a second braking zone in a path of the vehicle, wherein the first braking zone is a straight path and the second braking zone includes a curve. Accordingly, the one or more processors determine the autonomous braking controls for the trailer in the first braking zone in the predicted path provide for up to full braking and the autonomous braking controls for the trailer in the second braking zone in the predicted path comprise a duty cycle where an amount of pulsing of the brakes is adjusted based on a degree of the curve in the second braking zone.

Further illustrative examples for the one or more processors determining braking duty cycles and/or braking magnitude for applying brakes at a trailer based on a curve of a predicted path are provided below in connection with FIGS. 3-6.

Figure 3:
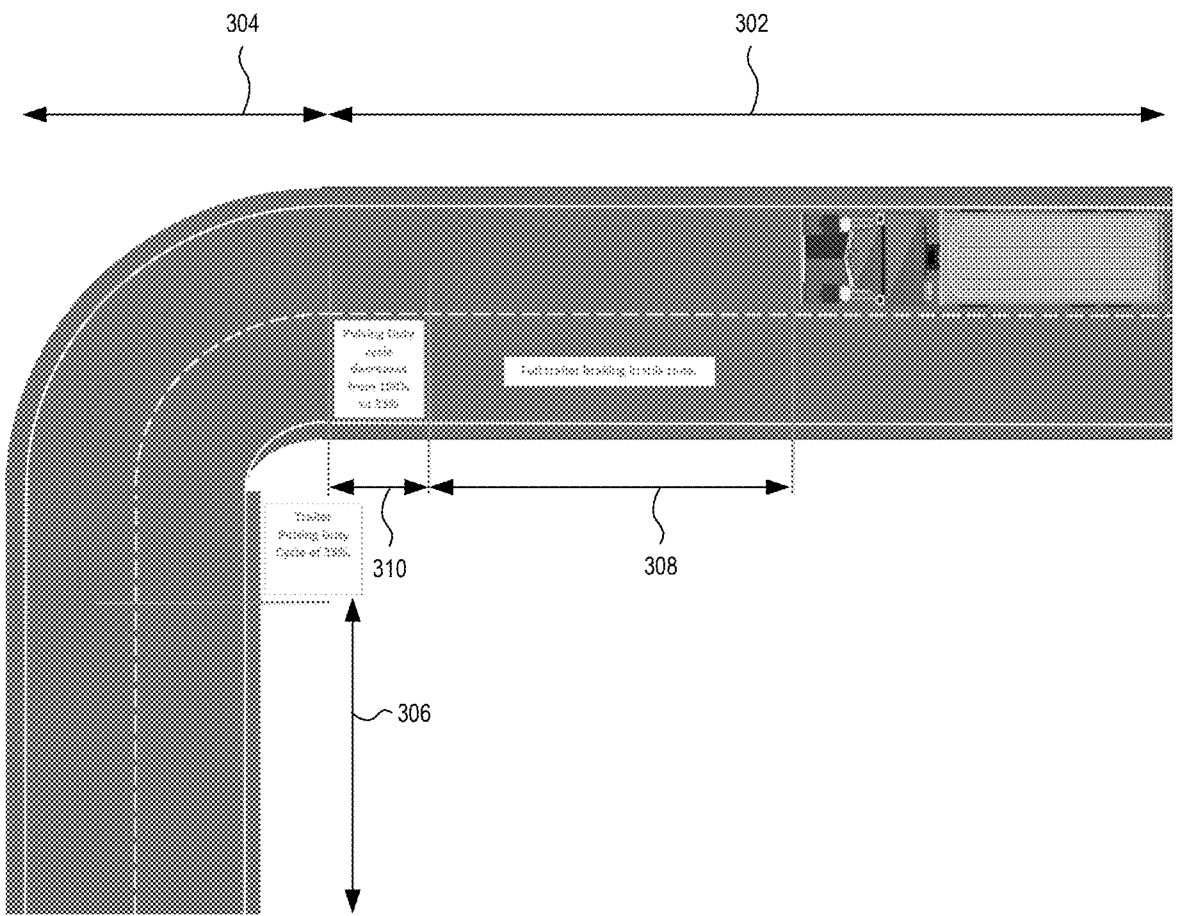
FIG. 3 is a graph illustrating examples of changes in braking duty cycles and/or braking magnitude for autonomous braking controls as a vehicle enters and exits a curve.

Referring to FIG. 3, in one example, the predicted path may indicate a first straight portion 302, a curved portion 304, and a second straight portion 306. The one or more processors may determine, based on the predicted path to apply up to full braking in a first zone 308 of the first straight portion 302. As the vehicle approaches the curved portion 304, the one or more processors determine to change a duty cycle of the trailer brakes in the second zone 310 of the first straight portion to prepare for the curved portion 304. In the illustrative example shown in FIG. 3, the one or more processors determine to reduce the duty cycle of the trailer braking from up to 100% (full trailer braking) to 33% percent. It will be appreciated that the duty cycle percentage is in relation to an amount of time that full braking is applied. In some implementations, based on a predicted path, the one or more processors may determine to adjust a magnitude of braking applied at the trailer in addition to changing a duty cycle of pulsing of the brakes at the trailer.

In some implementations, the one or more processors may determine to reduce the pulsing duty cycle of the trailer and/or adjust a brake magnitude at the trailer based on predetermined values obtained from a lookup table whose values are populated and periodically updated. For example, a lookup table may be indexed in part based on lateral acceleration at a vehicle that the system calculates for a portion of a predicted path using the formula V*(V/R), where V is a vehicle velocity and R is a radius of curvature of the predicted path. The calculated lateral acceleration would then be utilized to reference in the lookup table how to pulse the trailer brakes and/or adjust a magnitude of braking of the trailer brakes. Although the duty cycle is described here as being stored in a lookup table, other embodiments for calculating the duty cycle are calculated (e.g., linear calculation) are also contemplated.

In the example illustrated in FIG. 3, the one or more processors determine to maintain the pulsing duty cycle of the trailer at 33% through the curved portion 304 of the predicted path and then cease braking as the vehicle enters the second straight portion 306 of the predicted path.

Figure 4:
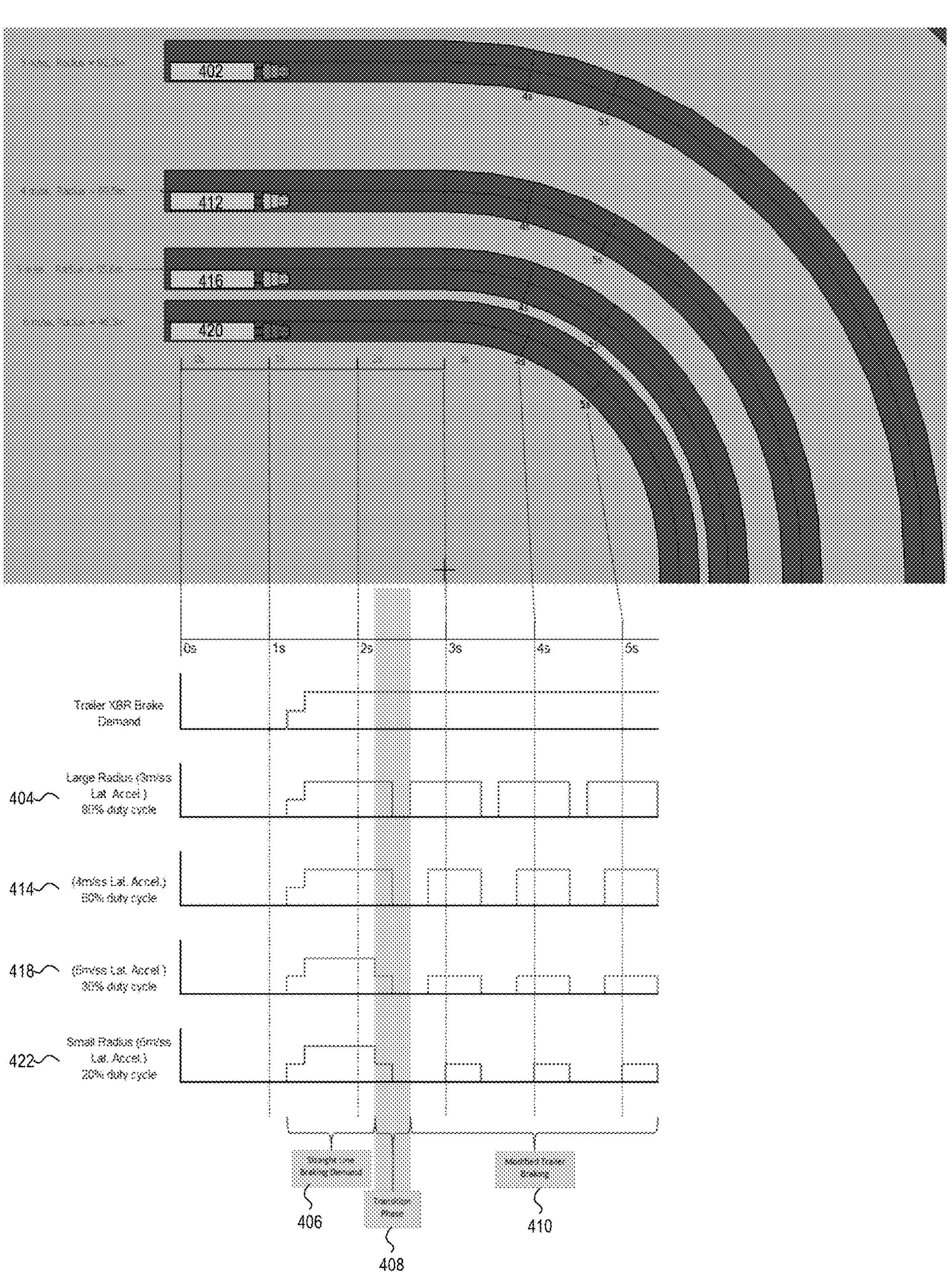
FIG. 4 is a graph illustrating examples of changes in braking duty cycles and/or braking magnitude for autonomous braking controls of a trailer as a vehicle enters curves with different radius of curvature.

FIG. 4 is a graph illustrating examples of changes in pulsing duty cycles and/or braking magnitude for braking controls of a trailer as a vehicle enters curves with different radius of curvature. In FIG. 4, the drawing of individual vehicles entering curves with different radius of curvature are generally aligned with graphs below illustrating a corresponding brake demand and duty cycle values for the trailer that the one or more processor determine as the vehicle enters the curve. For purposes of illustration, the vehicle speed shown in FIG. 4 remains constant throughout the curve, but it is to be understood that the vehicle speed may change due to brake application, loading, road grade, etc., for example.

For example, for vehicle 402 entering a curve with a radius of 92.7 meters at a speed of 60 kph, with a generated lateral acceleration of approximately 3 m/s/s, the one or more processor may increase braking as shown at line 404 to utilize up to full braking during the straight portion of the predicted path prior to the curve 406, transition from up to full braking to an 80% duty cycle during a transition period 408 of the predicted path, and then maintain the 80% duty cycle while the vehicle 402 travels around the curve 410 of the predicted path. As shown in line 404, an 80% duty cycle represents a percentage in relation to full braking such that 20% of the duty cycle represents "off" time where brakes are not applied.

For vehicle 412 entering a curve with a radius of 69.5 meters at a speed of 60 kph, with a generated lateral acceleration of 4 m/s/s, the one or more processors may increase braking as shown at line 414 to utilize up to full braking during the straight portion of the predicted path prior to the curve 406, transition from up to full braking to 60% duty cycle during the transition period 408 of the predicted path, and then maintain the 60% duty cycle while the vehicle 412 travels around the curve 410 of the predicted path. As shown in line 414, a 60% duty cycle represents a percentage in relation to full braking such that 40% of the duty cycle represents "off" time where brakes are not applied.

For vehicle 416 entering a curve with a radius of 55.60 meters at a speed of 60 kph, with a generated lateral acceleration of 5 m/s/s, the one or more processors may increase braking as shown at line 418 to utilize up to full braking during the straight portion of the predicted path prior to the curve 406, transition from up to full braking to 30% duty cycle during the transition period 408 of the predicted path, and then maintain the 30% duty cycle while the vehicle 416 travels around the curve 410 of the predicted path. As shown in line 418, a 30% duty cycle represents a percentage in relation to full braking that is achieved by both pulsing brakes at the trailer and by reducing a brake magnitude that is applied at the trailer.

For vehicle 420 entering a curve with a radius of 46.3 meters at a speed of 60 kph, with a generated lateral acceleration of 6 m/s/s, the one or more processors may increase braking as shown at line 422 to utilize up to full braking during the straight portion of the predicted path prior to the curve 406, transition from up to full braking to 20% duty cycle during the transition period 408 of the predicted path, and then maintain the 20% duty cycle while the vehicle 420 travels around the curve 410 of the predicted path. As shown in line 422, a 20% duty cycle represents a percentage in relation to full braking that is achieved by both pulsing brakes at the trailer and by reducing a brake magnitude that is applied at the trailer.

Figure 5:
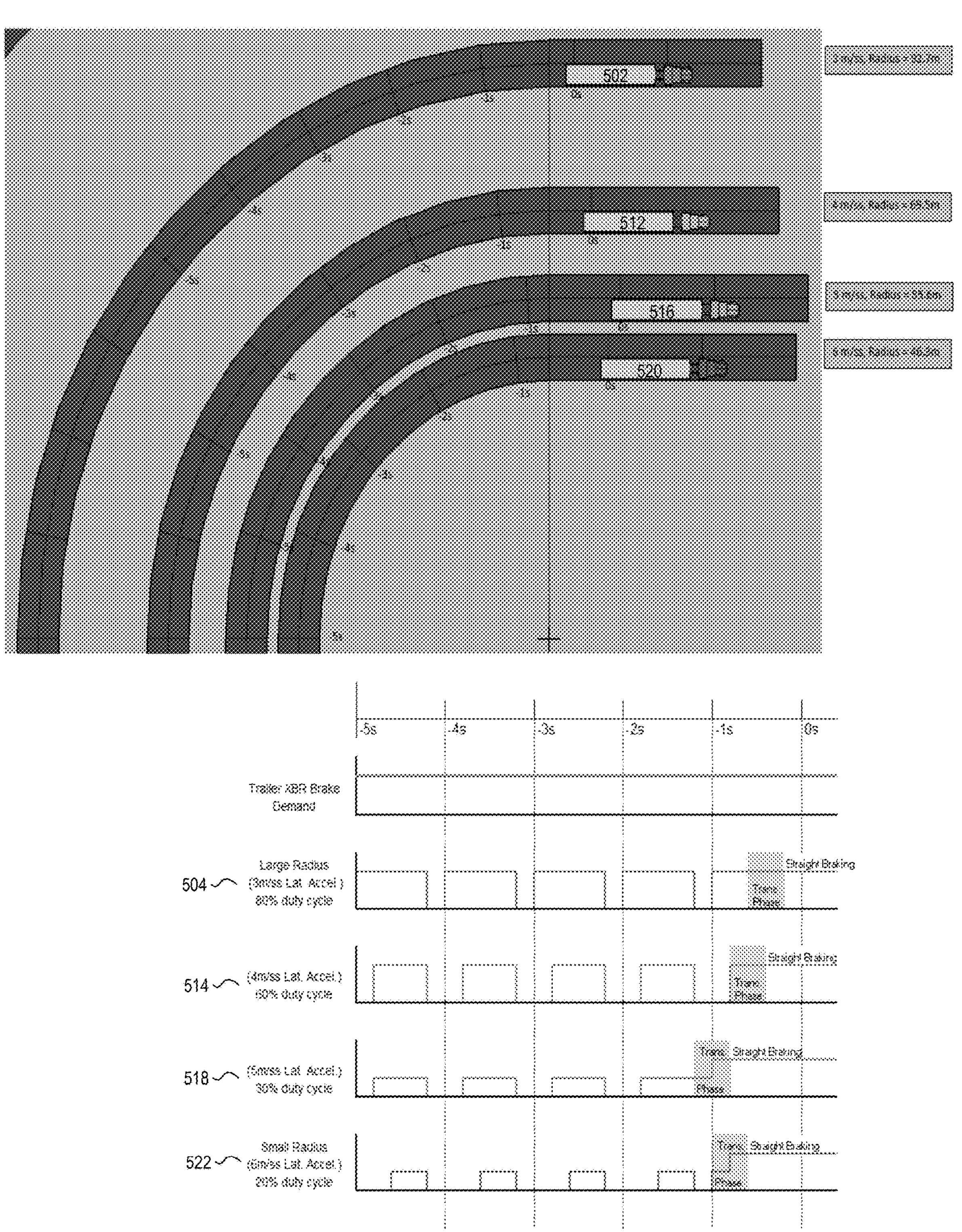
FIG. 5 is a graph illustrating examples of changes in braking duty cycles and/or braking magnitude for autonomous braking controls of a trailer as a vehicle exits curves with different radius of curvature.

FIG. 5 is a graph illustrating examples of changes in pulsing duty cycles and/or brake magnitude for braking controls of a trailer as a vehicle exits curves with different radius of curvature. In FIG. 5, the drawing of individual vehicles exiting curves with different radius of curvature are generally aligned by seconds with graphs below illustrating a corresponding brake demand and duty cycle values by second for the vehicle as it exits the curve. It will be appreciated that the vehicles exiting the curves in FIG. 5 correspond to the vehicles entering the curves in FIG. 4.

For vehicle 502 exiting a curve with a radius of 92.7 meters, with a generated lateral acceleration of 3 m/s/s, the one or more processor may, as shown in line 504, maintain a 80% duty cycle in the curve of the predicted path, transition from the 80% duty cycle to up to full breaking during a transition period of the predicted path, and then maintain up to full braking during the straight portion of the predicted path as the vehicle exits the curve. As shown in line 504, a 80% duty cycle represents a percentage in relation to full braking such that 20% of the duty cycle represents “off” time where brakes are not applied.

For vehicle 512 exiting a curve with a radius of 69.5 meters, with a generated lateral acceleration of 4 m/s/s, the one or more processor may, as shown in line 514, maintain a 60% duty cycle in the curve of the predicted path, transition from the 60% duty cycle to up to full breaking during a transition period of the predicted path, and then maintain up to full braking during the straight portion of the predicted path as the vehicle exits the curve. As shown in line 514, a 60% duty cycle represents a percentage in relation to full braking such that 40% of the duty cycle represents “off” time where brakes are not applied.

For vehicle 516 exiting a curve with a radius of 55.6 meters, with a generated lateral acceleration of 5 m/s/s, the one or more processor may, as shown in line 518, maintain a 30% duty cycle in the curve of the predicted path, transition from the 30% duty cycle to up to full breaking during a transition period of the predicted path, and then maintain up to full braking during the straight portion of the predicted path as the vehicle exits the curve. As shown in line 518, a 30% duty cycle represents a percentage in relation to full braking that is achieved by both pulsing brakes at the trailer and by reducing a brake magnitude that is applied at the trailer.

For vehicle 520 exiting a curve with a radius of 46.3 meters, with a generated lateral acceleration of 6 m/s/s, the one or more processor may, as shown in line 522, maintain a 20% duty cycle in the curve of the predicted path, transition from the 20% duty cycle to up to full breaking during a transition period of the predicted path, and then maintain up to full braking during the straight portion of the predicted path as the vehicle exits the curve. As shown in line 418, a 30% duty cycle represents a percentage in relation to full braking that is achieved by both pulsing brakes at the trailer and by reducing a brake magnitude that is applied at the trailer.

Figure 6:
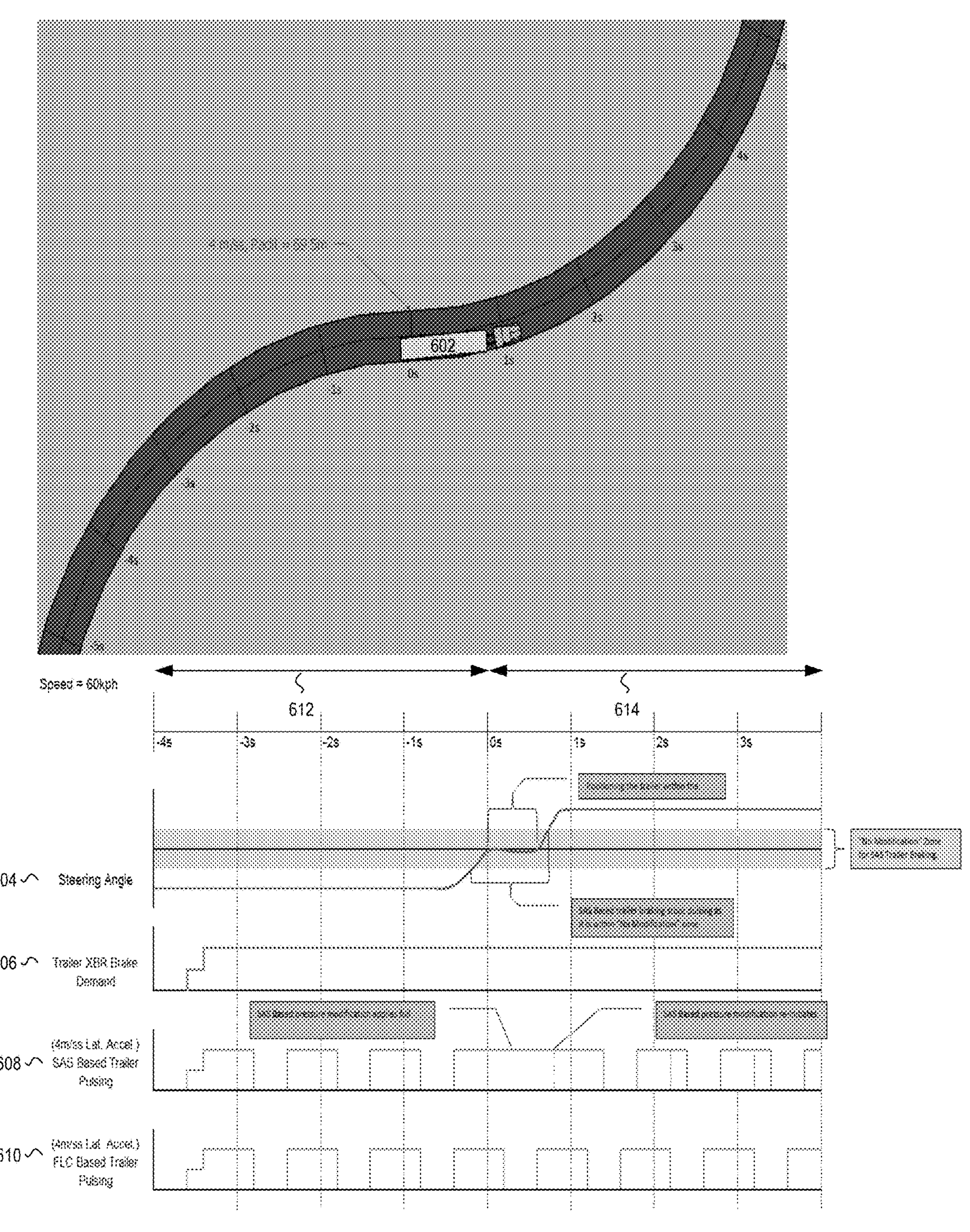
FIG. 6 is a graph illustrating examples of changes in braking duty cycles and/or braking magnitude for autonomous braking controls of a trailer as a vehicle travels along an S-curve.

FIG. 6 is a graph illustrating examples of changes in pulsing duty cycles for braking controls of a trailer as a vehicle travels along an S-curve. In FIG. 6, vehicle 602 travels around an S-curve with a first curve bending to the right and a second curve bending to the left. The vehicle 602 travels at 60 kps with a generated lateral acceleration of 4 m/s/s along the S-curve and each of the first bend and the second bend have a radius of 69.5 meters.

Below the illustration of the vehicle traveling along a S-curve are values corresponding in time increments to actions and/or measurements at the vehicle 402 as it travels along the S-curve.

Line 604 illustrates a steering angle of the vehicle changing in relation a change in direction along the S-curve. As shown, the steering angle of the vehicle 602 is in a first direction as the vehicle 602 travels along a first curve 612 of the S-curve. As the vehicle 602 exits the first curve 612 and transitions to enter a second curve 614 of the S-curve, the steering angle moves to zero, remains close to zero for a short period, and then transitions to a second direction that is opposite to the first direction.

Line 606 illustrates a trailer brake demand as the vehicle 602 travels around the S-curve. As illustrated, the brake demand increases as the vehicle 602 enters the S-curve and remains constant as the vehicle 602 travels along the S-curve.

Line 608 illustrates braking pulses by a trailer braking system using a Steering Angle Sensor (SAS) to apply braking to the trailer as the vehicle 602 travels along the S-curve. It will be appreciated that a system modifying trailer braking using the Steering Angle Sensor (SAS) is not able to anticipate lateral acceleration changing indicators and may apply a full braking as the steering moves to zero, such as when a vehicle transitions from the first curve 612 to the second curve 614 of the S-curve as illustrated at line 604.

The amount of time near zero steering may be long if a driver is compensating for trailer offtracking, moving from the outside of the right hand turn to the outside of the left hand turn. Offtracking occurs when a vehicle travels along a curve or makes a turn and rear wheels of the vehicle do not follow the same track as front wheels of the vehicle. However, due to this same offtracking, the trailer lateral acceleration will not dwell near zero nearly as long as the steering angle is near zero. Accordingly, it will be appreciated that a conventional SAS based system may apply full brake at the trailer during the transition phase between the first and second curves of the S-curve, which is not desired.

Line 610 illustrates braking pulses by a system utilizing data from a forward-looking imaging sensor, such as a camera, to apply autonomous braking to the trailer as the vehicle 602 travels around the S-curve.

It will be appreciated that a system using data from a forward-looking imaging sensors, such as a camera, can anticipate transitions such as an S-curve and continue modifying autonomous braking at a trailer through the transition from the first curve to the second curve of the S-curve. Because data from the forward-looking camera allows the system to generate equations based on information such as lane lines ahead that are captured by the forward-looking sensor, the system may accurately calculate a radius of curvature for the path ahead of the vehicle. Based on the determined radius of curvature of the path and a measured wheel speed information, the system may additionally calculate a lateral acceleration for the vehicle and set duty cycles for braking at the trailer based in part on the calculated lateral acceleration.

Referring again to FIG. 2, after the one or more processors determine autonomous braking controls for the vehicle and the trailer based on the predicted path determined at step 208 and the vehicle performance information received at step 206, as described above, at step 212, the one or more processors transmit the autonomous braking controls to the trailer. The autonomous braking controls are configured to adjust a braking pressure level and a braking duration at the trailer as the vehicle and trailer travel through at least a portion of the predicted path. As a result, the autonomous braking controls are able to provide instructions for braking at the trailer both for a current vehicle cornering state and a future vehicle cornering state. At step 214, the trailer implements the received autonomous braking controls.

It will be appreciated that as a vehicle travels along a projected path and braking continues, the above-described method is repeated so that autonomous braking controls to the trailer may be regularly updated based on detected vehicle performance and additional information generated by the forward-facing imaging sensor.

As discussed above in conjunction with FIGS. 1-6, the present disclosure provides systems that utilize data from one or more forward-looking imaging sensors, such as cameras, to monitor a state of a road ahead of a vehicle. Based on the data from the one more forward-looking imaging sensors, the system determines how to apply the brakes at the trailer in order to maintain stability while utilizing an increased amount of braking capacity at the. When the data indicates that a road ahead of the vehicle includes one or more curves, the system determines, based on the curvature of each curve, a duty cycle to pulse the brakes at the trailer during the one or more curves in order to maintain stability while utilizing an optimal amount of braking capacity at the trailer.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A system comprising:

memory; and at least one processor in communication with the memory and configured to:

receive instructions to initiate braking of a vehicle and a trailer coupled with the vehicle;

receive information from an imaging sensor, the information comprising at least data regarding a forward-looking view from the vehicle;

receive vehicle performance information regarding the vehicle and the trailer;

determine a predicted path of the vehicle and trailer based on the information from the imaging sensor and the vehicle performance information;

determine autonomous braking controls for the vehicle and the trailer based on the predicted path; and transmit the autonomous braking controls to the trailer, where the autonomous braking controls are configured to adjust a braking pressure level and a braking duration at the trailer as the vehicle and trailer travel through at least a portion of the predicted path;

wherein:

the predicted path indicates a curve within a braking zone of the vehicle and the trailer; and the autonomous braking controls for the trailer in the braking zone comprise a pulsing duty cycle that is adjusted based on a degree of a radius of the curve in the braking zone and a speed of the vehicle.

2. The system of claim 1, wherein the video information further comprises at least one of road lane information regarding a path of the vehicle or road curvature information regarding the path of the vehicle.

3. The system of claim 1, wherein the vehicle performance information regarding the vehicle and the trailer comprises at least one of a speed of the vehicle or a mass of the vehicle and the trailer.

4. The system of claim 1, wherein the at least one processor is configured to retrieve the pulsing duty cycle from a lookup table.

5. The system of claim 1, wherein the at least one processor is configured to calculate the pulsing duty cycle based on the degree of the radius of the curve and the speed of the vehicle in the braking zone.

6. A system comprising:

memory; and at least one processor in communication with the memory and configured to:

receive instructions to initiate braking of a vehicle and a trailer coupled with the vehicle;

receive information from an imaging sensor, the information comprising at least data regarding a forward-looking view from the vehicle;

receive vehicle performance information regarding the vehicle and the trailer;

determine a predicted path of the vehicle and trailer based on the information from the imaging sensor and the vehicle performance information;

determine autonomous braking controls for the vehicle and the trailer based on the predicted path; and transmit the autonomous braking controls to the trailer, where the autonomous braking controls are configured to adjust a braking pressure level and a braking duration at the trailer as the vehicle and trailer travel through at least a portion of the predicted path;

wherein:

the predicated path comprises a first braking zone and a second braking zone in a path of the vehicle, wherein the first braking zone is a straight path and the second braking zone includes a curve; and the autonomous braking controls for the trailer in the first braking zone in the predicted path provide for up to full braking and the autonomous braking controls for the trailer in the second braking zone in the predicted path comprise a pulsing duty cycle that is adjusted based on a degree of a radius of the curve and a speed of the vehicle in the second braking zone.

7. A system comprising:

memory; and at least one processor in communication with the memory and configured to:

receive instructions to initiate braking of a vehicle and a trailer coupled with the vehicle;

receive information from an imaging sensor, the information comprising at least data regarding a forward-looking view from the vehicle;

receive vehicle performance information regarding the vehicle and the trailer;

determine a predicted path of the vehicle and trailer based on the information from the imaging sensor and the vehicle performance information;

determine autonomous braking controls for the vehicle and the trailer based on the predicted path; and transmit the autonomous braking controls to the trailer, where the autonomous braking controls are configured to adjust a braking pressure level and a braking duration at the trailer as the vehicle and trailer travel through at least a portion of the predicted path;

wherein:

the predicated path comprises a first braking zone and a second braking zone in a path of the vehicle, wherein the first braking zone is a first curve and the second braking zone includes a second curve, where the first and second curves have different radius of curvature;

the braking controls for the trailer in the first braking zone in the predicted path comprise a first duty cycle that is adjusted based on a degree of a radius of the curve and a speed of the vehicle in the first braking zone; and the braking controls for the trailer in the second braking zone in the predicted path comprise a second pulsing duty cycle that is adjusted based on the degree of the radius of the curve and the speed of the vehicle in the second braking zone.

8. The system of claim 1, wherein the imaging sensor comprises at least one of a camera, LiDAR, or radar.

9. A method comprising:

receiving, with at least one processor, instructions to initiate braking of a vehicle and a trailer coupled with the vehicle;

receive, with the at least one processor, information from an imaging sensor, the information comprising at least data regarding a forward-looking view from the vehicle;

receive, with the at least one processor, vehicle performance information regarding the vehicle and the trailer;

determining, with the at least one processor, a predicted path of the vehicle and trailer based on the information from the imaging sensor and the vehicle performance information;

determining, with the at least one processor, autonomous braking controls for the vehicle and the trailer based on the predicted path; and transmitting, with the at least one processor, the autonomous braking controls to the trailer, where the autonomous braking controls are configured to adjust a braking pressure level and a braking duration at the trailer as the vehicle and trailer travel through at least a portion of the predicted path;

wherein:

the predicted path indicates a curve within a braking zone of the vehicle and the trailer; and the autonomous braking controls for the trailer in the braking zone comprise a pulsing duty cycle that is adjusted based on a degree of a radius of the curve in the braking zone and a speed of the vehicle.

10. The method of claim 9, wherein the video information further comprises at least one of road lane information regarding a path of the vehicle or road curvature information regarding the path of the vehicle.

11. The method of claim 9, wherein the vehicle performance information regarding the vehicle and the trailer comprises at least one of a speed of the vehicle or a mass of the vehicle and the trailer.

12. The method of claim 9, further comprising:

retrieving, with the at least one processor, the pulsing duty cycle from a lookup table.

13. The method of claim 9, further comprising:

calculating, with the at least one processor, the pulsing duty cycle based on the radius of the degree of the curve and the speed of the vehicle in the braking zone.

14. The method of claim 9, wherein the imaging sensor comprises at least one of a camera, LiDAR, or radar.

* * * * *